(12) United States Patent
Negi et al.

(10) Patent No.: US 6,294,120 B1
(45) Date of Patent: *Sep. 25, 2001

(54) PURGING AGENT AND PURGING METHOD

(75) Inventors: Taichi Negi; Syukiti Kawamura; Hiromichi Nakano; Satoshi Hirofuji, all of Kurashiki (JP)

(73) Assignee: Kuraray Co., Ltd., Kurashiki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,878

(22) Filed: Jun. 18, 1997

(30) Foreign Application Priority Data

Jun. 18, 1996 (JP) .................................... 8-156761

(51) Int. Cl.⁷ ...................................................... B28B 3/20
(52) U.S. Cl. ........................ 264/176.1; 264/39; 524/394; 524/400; 524/401; 524/413; 524/417; 524/425; 524/430; 524/431; 524/437; 524/435; 524/493; 524/557
(58) Field of Search ..................................... 524/379, 388, 524/394, 400, 430, 431, 435, 557, 148, 417, 425, 401, 413, 437, 493; 525/60, 61; 264/39, 176.1

(56) References Cited

U.S. PATENT DOCUMENTS

| | | | | |
|---|---|---|---|---|
| 4,091,077 | * | 5/1978 | Smith et al. | 423/298 |
| 5,707,569 | * | 1/1998 | Priester et al. | 264/39 |

* cited by examiner

*Primary Examiner*—Judy M. Reddick
(74) *Attorney, Agent, or Firm*—Oblon, Spivak, McClelland, Maier & Neustadt, P.C.

(57) ABSTRACT

A purging agent which contains an ethylene-vinyl alcohol copolymer and which satisfies the conditions specified by the equations (1) and (2) below:

$$20 \geq BT_{(120)} \geq 0.1 \quad (1)$$

$$500 \geq BT_{(250)}/BT_{(120)} \geq 1.5 \quad (2),$$

where $BT_{(120)}$ is weight loss (%) on heating in nitrogen at 120° C. for 24 hours, and $BT_{(250)}$ is weight loss (%) on heating in nitrogen at 250° C. for 6 hours, rapidly discharges residual thermoplastic resin containing EVOH from molding equipment, and also rapidly discharges itself when a fresh resin is fed again to the equipment. This leads to a remarkable reduction in loss due to residual purging agent. In addition, the purging agent causes only a small amount of resin to stick to the equipment, even after repeated purging. After purging, it is possible to restore normal operation within a short period of time.

9 Claims, No Drawings

PURGING AGENT AND PURGING METHOD

BACKGROUND OF THE INVENTION

1. Field of the Invention

The present invention relates to a purging agent to rapidly purge thermoplastic resins, especially those which contain ethylene-vinyl alcohol copolymer (EVOH), from melt passages after a molding operation. Only a little of this purging agent remains after use, and therefore causes virtually no defects after the reintroduction of a fresh thermoplastic resin into the passages.

2. Description of the Background

EVOH has gained wide acceptance as a packaging film and for containers, because of its good oxygen and flavor barrier properties, which are required for some types of foods and articles.

Unfortunately, EVOH is subject to gelation and decomposition. This occurs in the pocket of the extrusion passage, after long periods of extrusion operation. This may give rise to undesirable matter, which manifests itself as stones and streaks or as irregular thickness in the extrusion product, giving the product a poor appearance. Moreover, EVOH gels and decomposes with foaming in the passage when operation is resumed, with the result that yellowed EVOH or gelled EVOH emerges continuously, requiring long periods of time until acceptable products are obtained. In the worst cases, it is necessary to disassemble the equipment for cleaning. This same problem also arises in molding operations, after switching from EVOH to another resin (such as polyolefin, polyamide, polyester and polycarbonate) or another grade of EVOH (differing in ethylene content). The problem is particularly serious when switching to polyamide, polyester or polycarbonate, which are readily reactive with EVOH.

One way to address this problem is by purging the passages of EVOH with high-density polyethylene (HDPE), linear low-density polyethylene (LLDPE), polystyrene (PS) or poly-propylene (PP). Purging is carried out whenever any anomaly (stones and/or streaks) occurs during operation, or when operation is suspended. For effective purging, a resin (as the purging agent) having a low melt flow rate of about 0.05–10 g/10 min (at 190° C. under a load of 2160 g) is commonly used. Another purging method is by staged switching to grades having a lower melt flow rate, by reduction of the extrusion temperature, or increase of the output.

The purging method mentioned above requires a complex procedure, takes a long time to carry out, or requires a large amount of purging agent. In addition, when EVOH molding is resumed after purging, the purging agent continues to enter the product, requiring long periods of time until acceptable products are obtained. Such residual purging agent manifests itself as stones and streaks which are a great hindrance to transparent multilayered objects produced from EVOH by coextrusion or coinjection molding with PS, polyethylene terephthalate (PET), polycarbonate (PC) or the like. If multilayered objects are drawn, such stones and streaks break the EVOH layer, resulting in pinholes.

Removal of gels of EVOH in the passage is achieved most effectively by using a purging agent having a low melt flow rate. However, such a purging agent is difficult to discharge once EVOH molding is resumed; it remains in the passage and continues to enter the products for a long time. One way measure to cope with this situation is to repeatedly switch from one purging agent to another having a higher melt flow rate. However, this is undesirable because it requires a complex procedure, takes a long time, and requires a large amount of purging agent.

Using a blend of polyamide and polyether elastomer as a purging agent is disclosed in Japanese Patent Laid-open No. 178545/1989. This method offers the advantage that the time required for acceptable products to be obtained is short after resumption of EVOH molding. This purging method is, however, unsatisfactory.

Japanese Patent Laid-open No. 269754/1993 discloses the use of an EVOH-based purging agent combined with an acid substance and a metal salt, in a specific ratio. This purging agent permits acceptable products to be obtained a short time after resumption of EVOH molding. However, it does not efficiently remove resin present in the pocket of the resin passage. Likewise, Japanese Patent Laid-open No. 279518/1993 discloses the use of a polyolefin-based purging agent combined with a metal salt. Its effectiveness is offset by the fact that repeated molding and purging for a long period of time results in the accumulation of gelled resin in the pocket of the resin passage, and requires a prolonged time before satisfactory production. (This will be demonstrated by a Comparative Example given later.)

Japanese Laid-Open Patent No. 308899/1990 discloses a detergent for molding machines which is composed of a thermoplastic resin having a specific melt flow rate and a prescribed amount of water. However, it describes neither EVOH nor problems with melt stability characteristic of EVOH.

SUMMARY OF THE INVENTION

In view of the foregoing, it is important to develop a new purging material capable of easily discharging residual gels from resin passages during melt molding of a thermoplastic resin containing EVOH, which is easily discharged by fresh thermoplastic resin after resumption of molding, with a minimum of gel formed during long periods of operation.

An object of the invention is to provide a new purging agent which permits normal operation to be restored shortly after resumption of molding, without forming much EVOH gel, which sticks to the resin passage even after long periods of operation.

The new purging agent developed to achieve the above-mentioned object contains an ethylene-vinyl alcohol copolymer and satisfies the conditions specified by the equations (1) and (2) below:

$$20 \geq BT_{(120)} \geq 0.1 \tag{1}$$

$$500 \geq BT_{(250)}/BT_{(120)} \geq 1.5 \tag{2}$$

where $BT_{(120)}$ is weight loss (%) on heating in nitrogen at 120° C. for 24 hours, and $BT_{(250)}$ is weight loss (%) on heating in nitrogen at 250° C. for 6 hours.

According to a preferred embodiment of the present invention, the purging agent may contain water in an amount of 0.1–20 wt %. According to another embodiment, the purging agent may contain inorganic powder in an amount of 0.01–20 wt %.

The purging agent of the present invention may be used to purge a thermoplastic resin I containing ethylene-vinyl alcohol copolymer from the melt passage after extrusion molding. This purging method is also within the scope of the present invention.

The purging agent of the present invention offers the advantage of rapidly discharging residual EVOH-containing thermoplastic resin from the melt passage of molding equipment and of rapidly discharging itself after reintroduction of fresh thermoplastic resin into molding equipment. The rapid discharging greatly reduces defectives due to residual purging agent. In addition, even when molding and purging are repeated one after the other, only a little purging agent remains in the molding equipment. This permits normal operation to be restored in a short period of time.

The mechanism for the above-mentioned effect is not fully understood. It is assumed that the purging agent foams on heating in the extruder, causing an anomalous flow which effectively discharges residual EVOH and gelled resin formed by holding-up.

DETAILED DESCRIPTION OF THE INVENTION

The present invention produces its salient effect, as demonstrated in the Examples that follow, owing to the purging effect. The purging agent contains an ethylenevinyl alcohol copolymer and satisfies the conditions specified by the equations (1) and (2) below:

$$20 \geq BT_{(120)} \geq 0.1 \quad (1)$$

$$500 \geq BT_{(250)}/BT_{(120)} \geq 1.5 \quad (2)$$

(where $BT_{(120)}$ is weight loss (%) on heating in nitrogen at 120° C. for 24 hours, and $BT_{(250)}$ is weight loss on heating in nitrogen at 250° C. for 6 hours.)

According to the present invention, the value of $BT_{(120)}$ should be greater than or equal to 0.1%, preferably greater than 0.2%, more preferably greater than 0.5%, and most preferably greater than 1.0%. With a value smaller than 0.1%, the purging agent does not produce its effect satisfactorily. In addition, the value of $BT_{(120)}$ should be smaller than or equal to 20%, preferably smaller than 10%, and more preferably smaller than 5%. With a value greater than 20%, the purging agent foams excessively, causing inhomogeneous resin flow, without producing its effect satisfactorily.

According to the present invention, the value of $BT_{(250)}/BT_{(120)}$ should be greater than or equal to 1.5, preferably greater than 2, and more preferably greater than 3. With a value smaller than 1.5, purging agent will require an unduly long period of time before normal operation is restored. In addition, it should be smaller than or equal to 500, preferably smaller than 400, and more preferably smaller than 300. With a value greater than 500, the purging agent itself is too low in viscosity to purge itself and hence does not produce its purging effect satisfactorily.

Weight loss on heating is calculated from the equation below.

$$(1-a) \times 100(\%)$$

where, a is the weight of a 1 g resin sample measured after heating in a nitrogen-filled 10-ml glass tube at a prescribed temperature for a prescribed period of time.

The purging agent of the present invention is prepared from a thermoplastic resin as a base polymer. The base polymer may be a resin or resin compound containing EVOH. It may be neat EVOH or an EVOH compound combined with a resin such as polyolefin, polystyrene, polyamide, polyester, polyvinyl chloride, polyvinylidene chloride, or combinations thereof.

According to the present invention, the purging agent should preferably be composed of EVOH resin alone. The combined use of EVOH with any other thermoplastic resin is economically advantageous over the use of only EVOH; however, this advantage is offset by a decreased purging effect and a longer time required before the restoration of normal operation. The purging agent based on EVOH resin alone is desirable from the standpoint of economy and purging performance.

EVOH as the base polymer of the purging agent of the present invention is a hydrolyzed ethylene-vinyl acetate copolymer, with an ethylene content of 15–70 mol %, preferably 20–65 mol %, and with a degree of hydrolysis of the vinyl acetate moiety of greater than 90%, preferably greater than 95%. It may contain a small amount of comonomer such as propylene, 1-butene, 1-hexene, 4-methyl-1-pentene, acrylic ester, methacrylic ester, maleic acid, phthalic acid, itaconic acid, alkylvinyl ester, N-vinylpyrrolidone, N-n-butoxymethylacrylamide, N-(2-dimethylamino-ethyl)methacrylamide, and quaternary products thereof, vinyltrimethoxysilane, vinyltriethoxysilane, vinylmethyldiinethoxysilane, and vinyltrimethoxysilane. It may also contain a boron compound (such as boric acid, metal borate, borate ester, and/or boron complex) for adjustment of its melt viscosity. It may also contain an acid or metal salt mentioned above for thermal stability and oxidation resistance and for improvement in color.

The base polymer in the form of resin composition should preferably be composed of EVOH and polyolefin. A preferred polyolefin is high-density polyethylene (HDPE) or polypropylene (PP) having a high melt flow rate (at 190° C. under a load of 2160 g) which is 1–1/100, preferably 1/5–1/90, of that of EVOH. The blending ratio of EVOH/polyolefin should ranges from 1/99 to 99/1, preferably from 5/95 to 95/5, more preferably from 10/90 to 90/10, by weight. This base polymer (or resin composition) readily discharges gels as demonstrated in the Examples given later.

The purging agent satisfies the conditions specified by the equations (1) and (2) mentioned above may typically be prepared by the following steps (a) and (c), or (b) and (c), in combination.

Step (a): Incorporating a thermoplastic resin with a low-boiling compound having a boiling point lower than 300° C., preferably lower than 280° C., and more preferably lower than 250° C. in an amount of 0.1–20 wt %. Examples of low-boiling compounds include water, alcohol (such as methyl alcohol, ethyl alcohol, propyl alcohol, and butyl alcohol), and polyhydric alcohol (such as ethylene glycol, propylene glycol, and glycerin). The amount of low-boiling compound should be more than 0.1 wt %, preferably more than 0.2 wt %, more preferably more than 0.5 wt % and most preferably more than 1.0 wt %. An amount less than 0.1 wt % is not enough for satisfactory purging performance. The upper limit is less than 20 wt %, preferably less than 10 wt %, and more preferably less than 5 wt %. With an amount in excess of 20 wt %, the resulting purging agent does not produce a satisfactory purging effect due to excessive foaming and inhomogeneous resin flow.

Of the low-boiling, compounds, water is desirable from the standpoint of safety and production cost. Incorporation of water may be accomplished by mixing a molten resin with water in a twin-screw extruder and pelletizing the extrudate at a low temperature, by extruding moistened EVOH through a twin-screw extruder and pelletizing the extrudate at a low temperature, by dipping pellets in water, by spraying pellets with water, or by allowing pellets to stand in a high-humidity atmosphere.

Step (b): Incorporation of a thermoplastic resin with a carrier which has absorbed a large amount of low-boiling compound (such as water, alcohol, and polyhydric alcohol mentioned above). Examples of the carrier include water-absorbed gel, polyvinyl alcohol, polyacrylamide, polyethylene glycol, and polypropylene glycol. The amount of the carrier should be 1–40 wt % so that the low-boiling compound accounts for 0.1–20 wt % of the thermoplastic resin.

Step (c): Incorporation of a metal salt in an amount of 0.0005–0.5 wt % (in terms of the metal). Examples of metal salts include carboxylates, phosphates, carbonates, chlorides, and mixtures thereof Alkaline metal salts and alkaline earth metal salts are preferable. Alkaline earth metal salts are more preferable. And alkaline earth metal carboxylates (such as calcium acetate, magnesium acetate, magnesium stearate, and calcium stearate) are most preferable. The amount of the metal salt should be 0.0005–0.5 wt %, preferably 0.001–0.5 wt %, and more preferably 0.01–0.5 wt %, in terms of the metal. The metal salt may be used in combination with an acid (such as acetic acid, adipic acid and potassium dihydrogen phosphate) or an alkali (such as sodium hydroxide).

The purging agent of the present invention will discharge residual gel from the passage more effectively if it is incorporated with an inorganic fine powder in an amount of 0.01–20 wt %. Presumably this effect is due to the ability of inorganic fine powder to physically scrape off residual gel remaining in the passage.

Examples of the inorganic fine powder include oxides, hydroxides, and chlorides of silicon, aluminum, iron, copper, cobalt, and manganese, and mixtures thereof. The inorganic fine powder is not specifically restricted in particle size. More than 80 wt % of the powder may be accounted for by particles smaller than 10 $\mu$m, preferably smaller than 6 $\mu$m, and more preferably smaller than 3 $\mu$m. The amount of the inorganic fine powder may be 0.01–20 wt %, preferably 0.02–10 wt %, of the amount of the thermoplastic resin as the base polymer of the purging agent. Preferred examples of the inorganic fine powder include silicon oxide, titanium oxide, montmorillonite, and hydrotalcite.

The purging agent of the present invention may be used for any melt extrusion equipment, such as a single-film extruder, a single-film tubular film extruder, a coextrusion sheet or film forming machine, a coextrusion blow molding machine, or a coinjection molding machine.

The purging agent is used when the extruder hopper becomes empty after extrusion of a thermoplastic resin containing EVOH. The amount of the purging agent should be about 6 to 20 times the amount of the resin remaining in the extruder. Increasing the screw revolution is one way of enhancing the purging effect. After purging, extrusion for a fresh thermoplastic resin may be resumed by any of the following three methods:

(a) Feed a fresh thermoplastic resin immediately after purging;
(b) After purging, suspend the screw rotation, while maintaining the extruder temperature, until the purging agent increases in melt flow rate, and then restart extrusion for a fresh thermoplastic resin;
(c) After purging, suspend extrusion while lowering the temperature (during which the purging agent increases in melt flow rate), and then restart extrusion for a fresh thermoplastic resin.

Incidentally, in the case of (a) above, it is desirable to slightly increase the extruder temperature so that the purging agent increases in melt flow rate rapidly and produces the purging effect more readily.

The purging agent of the present invention may be applied to any resin compound containing EVOH. It produces its maximum effect when applied to neat EVOH. The EVOH to be purged may be the same one as used for the base polymer of the purging agent. It is desirable that the EVOH to be purged should not differ appreciably from the EVOH for the base polymer of the purging agent in ethylene content and degree of hydrolysis. The difference in ethylene content should be preferably less than 30 mol %, more preferably less than 25 mol %. The difference in degree of hydrolysis should be preferably lower than 20%, more preferably lower than 15%. The small difference in ethylene content and degree of hydrolysis contributes to effective purging owing to their better affinity. The resin compound containing EVOH may be formed by blending with a polyolefin (such as polyethylene and polypropylene), polystyrene, polyamine, polyester, polyvinyl chloride or polyvinylidene chloride.

EXAMPLES

Having generally described this invention, a further understanding can be obtained by reference to certain specific examples which are provided herein for purposes of illustration only and are not intended to be limiting unless otherwise specified.

Measurements of $BT_{(120)}$ and $BT_{(250)}$.

An accurately weighed sample (about 3 g) is placed in a test tube (24 mm in outside diameter) lined with Teflon film to prevent the sample from sticking to the glass wall. This test tube is placed in an iron pipe (170 mm long and 30 mm in outside diameter). The atmosphere in the pipe is thoroughly replaced with nitrogen in a chamber and the pipe is tightly sealed with a screwed lid. The assembly is heated in a drier at a prescribed temperature for a prescribed period of time. The assembly is allowed to cool to room temperature and then opened. The sample is dried in a vacuum drier at 90° C. for 16 hours and then allowed to cool in a desiccator. The heat-treated sample is weighed (in grams) and the weight loss on heating is calculated from the equation below.

$$[\{3-(\text{weight after heating})\}\div 3]\times 100(\%)$$

Measurements of Water Content

Measurements are carried out by using a Karl Fischer water content meter (Model VA-06 and CA-03, made by Mitsubishi Chemical Industries, Ltd.). A sample (1 g) is placed in the meter which has been dried at 200° C. for 2 minutes. After heating at 200° C. for 2 minutes, measurements are started, and the value at the end point is obtained as the water content.

Stones on the Film Surface

A film sample is taken one hour after the start of the fifth operation. The sample is visually inspected and the number of stones within an area (10×10 cm) is counted.

Streaks on the Film Surface

A film sample is taken one hour after the start of the fifth operation. The sample is visually inspected and the number of streaks within a width of 40 cm is counted. The results are rated as A to E according to the following:

A: 0–2 streaks/40 cm width
B: 3–9 streaks/40 cm width
C: 10–29 streaks/40 cm width
D: 30–99 streaks/40 cm width
E: more than 100 streaks/40 cm width Example 1

A resin compound was prepared from the following components by melt mixing at 180° C. using a twin-screw extruder:

(i) EVOH powder with an ethylene content of 31 mol %, a degree of hydrolysis of 99.4%, and a melt flow rate of 1.3 g/10 min (at 190° C. under a load of 2160 g), containing 0.02 wt % of acetic acid, 20 ppm of calcium (in terms of metal), and 10 ppm of magnesium (in terms of metal);
(ii) magnesium stearate (MgSt): 2 wt % (0.08 wt % in terms of metal)
(iii) water: 1.4 wt %

The extrudate was pelletized in water at 80° C., pressurized at 4 kg/cm$^2$, by using an under-water cutter. The resulting pellets were centrifugally dehydrated and then dried at 80° C. for 1 hour. Thus there was obtained a purging agent containing 1.3 wt % water, characterized by $BT_{(120)}$=1.3% and $BT_{(250)}$=35%.

Extrusion was carried out to form a 50-$\mu$m thick EVOH single-layer tubular film from EVOH specified below by using a 40-mm single-screw extruder under the conditions specified below:

(i) EVOH with an ethylene content of 1 mol %, a degree of hydrolysis of 99.4%, and a melt flow rate of 1.3 g/10 min (at 190° C. under a load of 2160 g)
(ii) Extrusion from a circular die (150 mm in diameter), at 230° C. and a throughput of 20 kg/hour.

After continued operation for 105 hours, marked stones and streaks began to come out on the film surface. The purging agent prepared as mentioned above was fed to the extruder for about 30 minutes under the same operating conditions as mentioned above, with the throughput kept at 20 kg/hour. Operation was suspended.

Incidentally, "marked stones or streaks" mean stones in excess of 300/100 cm$^2$ or streaks in excess of 100/40 cm width.

On the following day, the equipment was heated and extrusion of EVOH was resumed. Sixty minutes after the first resumption, a satisfactory film (free from stones and streaks) came out. The film was regarded as satisfactory when it has less than 300 stones/100 cm$^2$ and satisfies the criterion D for streaks.

Extrusion for film production was continued. After 100 hours, stones and streaks began to come out on the film surface. The purging agent was fed in the same manner as mentioned above, and operation was suspended. On the following day, the equipment was heated and extrusion of EVOH was resumed. Sixty-two minutes after the second resumption, a satisfactory film (free from stones and streaks) came out. The same procedure as above was repeated. After 98 hours, stones and streaks began to come out. Sixty-five minutes after the third resumption, a satisfactory film came out. The fourth and fifth suspension and resumption were repeated in the same manner as above. The results are shown in Table 2.

After the completion of the fifth operation, LDPE was fed to the extruder and extrusion was carried out for 1 hour at a throughput of 20 kg/hour. The extruder was disassembled and cleaned. It was found that the amount of resin sticking to the screw and die was only 1.6 g and 2.5 g, respectively.

Comparative Example 1

The suspension and resumption of operation were repeated in the same manner as in Example 1, except that the purging agent was not used. The results are shown in Table 2.

Examples 2 to 8 and Comparative Examples 2 to 8

The same procedure as in Example 1 was repeated except that the kind of purging agent was chanced as shown in Table 1. The results are shown in Table 2. In the examples and comparative examples, the following, base polymers and additives were used:

EVOH-1
  ethylene content: 31 mol %
  degree of hydrolysis: 99.4%
  melt flow rate: 1.3 g/10 min (at 190° C. under a load of 2160 g)
  acetic acid: 0.02 wt %
  calcium: 20 ppm (in terms of metal)
  magnesium: 10 ppm (in terms of metal)

EVOH-2
  ethylene content: 31 mol %
  degree of hydrolysis: 99.4%
  melt flow rate: 1g/10 min (at 190° C. under a load of 2160 g)
  acetic acid: 0.1 wt %
  calcium: 80 ppm (in terms of metal)
  magnesium: 50 ppm (in terms of metal)
  potassium dihydrogenphosphate: 120 ppm LDPE
  "Mirason 102" (trademark; low-density polyethylene from Mitsui Petrochemical Industries Ltd.); melt flow rate: 0.8 g/10 min (at 190° C. under a load of 2160 g)

PP
  "FH1015B" (trademark; polypropylene from Tonen Sekiyu Kagaku K.K.); melt flow rate: 0.6 g/10 min (at 190° C. under a load of 2160 g)

Colloidal Silica
  "Silicia 430" (trademark; colloidal silica from Fuji Silicia Kagaku K.K.); average particle diameter: 2.5 $\mu$m (measure by a coal tar counter)

TABLE 1

| | Base polymer | | Additives | | | | | | BT(120) | BT(250) | BT(250)/BT(120) |
|---|---|---|---|---|---|---|---|---|---|---|---|
| | Grade | wt % | Grade | wt % | Grade | wt % (as metal) | Grade | wt % | | | |
| Example 1 | EVOH-1 | 96.7 | Water | 1.3 | MgSt | 2(0.08) | — | — | 1.3 | 37 | 23 |
| Example 2 | EVOH-1 | 97.6 | Water | 0.4 | MgSt | 2(0.08) | — | — | 0.4 | 35 | 88 |
| Example 3 | EVOH-1 | 98.7 | Water | 1.3 | — | — | — | — | 1.6 | 4.6 | 2.8 |
| Example 4 | EVOH-1 | 67.8 | Water | 0.2 | MgSt | 2(0.08) | PP | 30 | 2.4 | 38 | 15.8 |
| Example 5 | EVOH-1 | 66.7 | Water | 1.3 | MgSt | 2(0.08) | PP | 30 | 3.4 | 39 | 11.5 |
| Example 6 | EVOH-1 | 77.8 | Water | 0.2 | MgSt | 2(0.08) | Inorganic powder | 20 | 0.4 | 39 | 98 |
| Example 7 | EVOH-1 | 76.7 | Water | 1.3 | MgSt | 2(0.08) | Inorganic powder | 20 | 1.4 | 40 | 29 |
| Example 8 | EVOH-1 | 98.7 | Water | 0.65 | PrOH | 0.65 | — | — | 2.6 | 5.6 | 2.1 |
| Comparative Example 2 | EVOH-2 | 98.7 | Water | 1.3 | — | — | — | — | 1.3 | 1.9 | 1.2 |
| Comparative Example 3 | EVOH-1 | 98.0 | — | 98 | MgSt | 2(0.08) | — | — | 0.02 | 35 | 1750 |
| Comparative Example 4 | EVOH-2 | 100.0 | — | — | — | — | — | — | 0.01 | 0.1 | 10 |
| Comparative Example 5 | LDPE | 97.7 | Water | 1.3 | — | — | — | — | 1.3 | 1.6 | 1.3 |
| Comparative Example 6 | PP | 99.8 | Water | 0.2 | — | — | — | — | 0.01 | 0.01 | 1 |
| Comparative Example 7 | PP | 98 | — | — | MgSt | 2(0.08) | — | — | 0.01 | 0.01 | 1 |
| Comparative Example 8 | PP | 97.8 | Water | 0.2 | NaOH | 2 | — | — | 0.25 | 1.1 | 4.4 |

MgSt; Magnesium stearate
PrOH; 1-Propanol

TABLE 2

| | First time | | Second time | | Third time | | Fourth time | | Fifth time | | State of film Surface (after 11 hours) | | Amount of resin sticking to: | |
|---|---|---|---|---|---|---|---|---|---|---|---|---|---|---|
| | Time required for stones and streaks to occur (hours) | Time required for normal operation to restore (minutes) | Time required for stones and streaks to occur (hours) | Time required for normal operation to restore (minutes) | Time required for stones and streaks to occur (hours) | Time required for normal operation to restore (minutes) | Time required for stones and streaks to occur (hours) | Time required for normal operation to restore (minutes) | Time required for stones and streaks to occur (hours) | Time required for normal operation to restore (minutes) | Stones per 100 cm² | Streaks Rank | Screw (g) | Die (g) |
| Example 1 | 100 | 60 | 100 | 60 | 100 | 60 | 105 | 65 | 100 | 70 | 29 | A | 1.4 | 1.9 |
| Example 2 | 105 | 60 | 100 | 62 | 98 | 65 | 95 | 70 | 90 | 73 | 12 | A | 1.6 | 2.5 |
| Example 3 | 110 | 90 | 95 | 95 | 90 | 95 | 85 | 100 | 85 | 110 | 22 | B | 3.4 | 5.8 |
| Example 4 | 105 | 80 | 100 | 85 | 100 | 85 | 95 | 85 | 95 | 90 | 20 | A | 1.2 | 1.8 |
| Example 5 | 100 | 70 | 100 | 75 | 90 | 75 | 95 | 75 | 95 | 80 | 18 | A | 1.0 | 1.5 |
| Example 6 | 110 | 70 | 105 | 70 | 100 | 75 | 105 | 77 | 100 | 75 | 29 | A | 1.0 | 1.4 |
| Example 7 | 110 | 65 | 110 | 65 | 105 | 70 | 100 | 75 | 100 | 70 | 20 | A | 0.6 | 1.0 |
| Example 8 | 105 | 80 | 100 | 85 | 100 | 90 | 95 | 95 | 90 | 95 | 25 | A | 2.4 | 3.2 |
| Comparative Example 1 | 100 | 360< | 1> | 360< | 1> | 360< | 1> | 360< | 1> | 360< | 350 | E | 58.1 | 44.3 |
| Comparative Example | 105 | 90 | 100 | 95 | 90 | 110 | 70 | 120 | 45 | 150 | 290 | E | 4.4 | 2.9 |

TABLE 2-continued

| | First time | | Second time | | Third time | | Fourth time | | Fifth time | | State of film Surface (after 11 hours) | | Amount of resin sticking to: | |
|---|---|---|---|---|---|---|---|---|---|---|---|---|---|---|
| | Time required for stones and streaks to occur (hours) | Time required for normal operation to restore (minutes) | Time required for stones and streaks to occur (hours) | Time required for normal operation (minutes) | Time required for stones and streaks to occur (hours) | Time required for normal operation (minutes) | Time required for stones and streaks to occur (hours) | Time required for normal operation (minutes) | Time required for stones and streaks to occur (hours) | Time required for normal operation (minutes) | Stones per 100 cm² | Streaks Rank | Screw (g) | Die (g) |
| ple 2 Comparative Example 3 | 105 | 65 | 85 | 80 | 75 | 95 | 48 | 125 | 30 | 180 | 138 | C | 18.9 | 21.5 |
| Comparative Example 4 | 105 | 70 | 80 | 85 | 60 | 105 | 45 | 150 | 25 | 210 | 42 | D | 10.1 | 18.6 |
| Comparative Example 5 | 110 | 260 | 60 | 300 | 50 | 360< | 40 | 360< | 30 | 360< | 500 | D | 36.5 | 22.0 |
| Comparative Example 6 | 105 | 260 | 80 | 280 | 55 | 340 | 20 | 360< | 10 | 360< | 280 | E | 48.5 | 37.5 |
| Comparative Example 7 | 110 | 210 | 90 | 220 | 75 | 260 | 65 | 280 | 40 | 280 | 200 | E | 36.0 | 20.3 |
| Comparative Example 8 | 105 | 105 | 100 | 115 | 90 | 125 | 85 | 125 | 85 | 140 | 46 | B | 5.3 | 4.2 |

Effect of the Invention

The present invention provides a new purging agent which rapidly discharges residual thermoplastic resin from the molding equipment for a thermoplastic resin containing EVOH and also rapidly discharges itself when a fresh resin is fed again to the equipment. This leads to a remarkable reduction in loss due to residual purging agent. In addition, the purging agent causes only a small amount of resin to stick to the equipment even after repeated purging. After purging, it is possible to restore normal operation within a short time.

Obviously, numerous modifications and variations of the present invention are possible in light of the above teachings. It is therefore to be understood that within the scope of the appended claims, the invention may be practiced otherwise than as specifically described herein.

The priority document of the present application, Japanese patent application No. 156761/1996, filed Jun. 18, 1996, is hereby incorporated by reference.

What is claimed as new and desired to be secured by Letters Patent of the United States is:

1. A purging agent comprising a base polymer component which consists of an ethylene-vinyl alcohol copolymer, wherein the purging agent has a value of $BT_{(120)}$ of 1.0–5, and a ratio range of $BT_{(250)}/BT_{(120)}$ of 3/1–300/1, wherein said purging agent has a water content of 1.0–5 wt % based on the weight of the purging agent, and further comprising a salt selected from the group consisting of alkaline metal salts, alkaline earth metal salts, and mixtures thereof, in an amount of 0.0005–0.5 wt % based on the weight of the purging agent.

2. The purging agent of claim 1, further comprising an inorganic powder in an amount of 0.01–20 wt % based on the weight of the purging agent.

3. The purging agent of claim 1, wherein said salt is selected from the group consisting of carboxylates, phosphates, carbonates, chlorides and mixtures thereof.

4. The purging agent of claim 2, wherein said inorganic powder is selected from the group consisting of oxides, hydroxides and chlorides of silicon, aluminum, iron, copper, cobalt and manganese; and mixtures thereof.

5. A method of purging residual thermoplastic resin from a melt passage of an extruder after extrusion molding comprising:
    passing the purging agent of claim 1 through said melt passage.

6. A method of extrusion, comprising:
    extruding a first ethylene-vinyl alcohol copolymer with an extruder; followed by
    purging said extruder with the purging agent of claim 1; followed by:
    extruding a second ethylene-vinyl alcohol copolymer with said extruder.

7. The method of claim 6, where said first ethylene-vinyl alcohol copolymer and said second ethylene-vinyl alcohol copolymer have the same composition.

8. The method of claim 5, wherein said residual thermoplastic resin comprises an ethylene-vinyl alcohol copolymer.

9. The purging agent of claim 1, wherein said purging agent further comprises an inorganic powder selected from the group consisting of oxides, hydroxides, and chlorides of silicon, aluminum, iron, copper, cobalt, and maganese; and mixtures thereof; in an amount of 0.02–10 wt % based on the weight of the purging agent.

* * * * *